(12) United States Patent
Pruvost

(10) Patent No.: US 10,474,175 B2
(45) Date of Patent: Nov. 12, 2019

(54) LINEAR REGULATOR WITH A COMMON RESISTANCE

(71) Applicant: NXP B.V., Eindhoven (NL)

(72) Inventor: Xavier Pruvost, Bretteville-l'Orgueilleuse (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/248,741

(22) Filed: Jan. 15, 2019

(65) Prior Publication Data

US 2019/0220050 A1 Jul. 18, 2019

(30) Foreign Application Priority Data

Jan. 15, 2018 (EP) .................................. 18305028

(51) Int. Cl.
  *G05F 1/00* (2006.01)
  *G05F 3/22* (2006.01)
  (Continued)

(52) U.S. Cl.
  CPC ............ *G05F 1/575* (2013.01); *H04B 5/0037* (2013.01)

(58) Field of Classification Search
  CPC ............ G05F 1/575; G05F 1/468; G05F 1/00; G05F 3/30; G05F 3/22; G05F 1/10;
  (Continued)

(56) References Cited

U.S. PATENT DOCUMENTS

| 5,589,761 A | * | 12/1996 | Nelson .................... H02M 1/36 323/282 |
| 6,201,375 B1 | * | 3/2001 | Larson .................... G05F 1/573 323/277 |

(Continued)

FOREIGN PATENT DOCUMENTS

| CN | 103838290 A1 | 6/2014 |
| EP | 2 977 849 A1 | 1/2016 |

OTHER PUBLICATIONS

Rogers, E. "Stability analysis of low-dropout linear regulators with a PMOS pass element", Texas Instruments Incorporated, 10 pgs., retreived from the internet at: www.ti.com/lit/an/slyt194/slyt194. pdf (Aug. 1999).

(Continued)

*Primary Examiner* — Pablo N Tran

(57) ABSTRACT

A linear regulator is disclosed, comprising: a transistor having a control terminal, a first main terminal being a supply terminal connected to a supply input, and a second main terminal being an output terminal configured to provide a regulated output at an output connection; an error amplifier having a reference input, a feedback input and an output connected to the control terminal; a reference current source; a reference circuit configured to provide a reference voltage to the reference input from the reference current source; and a feedback circuit from the second main terminal through a feedback resistance (Rfb) and configured to provide a feedback voltage to the feedback input of the error amplifier; wherein the feedback circuit and the reference circuit include a common resistance (Rtail, Rd3), and at least one of the reference circuit and the reference circuit comprises a capacitive path (Cref) to a ground.

15 Claims, 5 Drawing Sheets

(51) Int. Cl.
*H04B 5/00* (2006.01)
*G05F 3/30* (2006.01)
*G05F 1/575* (2006.01)

(58) Field of Classification Search
CPC ........... G05F 3/02; G05F 1/56; H04B 5/0037; G11C 5/14; H03F 3/217; H03F 1/08
See application file for complete search history.

(56) References Cited

U.S. PATENT DOCUMENTS

| | | | | |
|---|---|---|---|---|
| 6,509,722 | B2* | 1/2003 | Lopata | H03F 3/45183 |
| | | | | 323/275 |
| 6,703,816 | B2* | 3/2004 | Biagi | G05F 1/575 |
| | | | | 323/275 |
| 9,030,186 | B2* | 5/2015 | Gupta | G05F 3/30 |
| | | | | 323/314 |
| 9,152,159 | B2* | 10/2015 | Kamiya | G11C 5/14 |
| 9,239,584 | B2* | 1/2016 | Lerner | G05F 1/565 |
| 9,454,168 | B2* | 9/2016 | Patel | G05F 1/575 |
| 9,778,667 | B2* | 10/2017 | Peluso | G05F 1/56 |
| 9,977,443 | B2* | 5/2018 | Guo | G05F 1/56 |
| 10,168,727 | B2* | 1/2019 | Lin | H03F 3/217 |
| 10,345,838 | B1* | 7/2019 | Karadi | G05F 1/573 |
| 2010/0117609 | A1 | 5/2010 | Koleno | |
| 2014/0091775 | A1 | 4/2014 | Tan et al. | |
| 2014/0312866 | A1 | 10/2014 | Dobkin et al. | |
| 2017/0351284 | A1* | 12/2017 | Avci | G05F 1/575 |

OTHER PUBLICATIONS

Heng, S. et al. "Low Power LDO with Fast Load Transient Response Based on Quick Response Circuit", IEEE International Symposium on Circuits and Systems, pp. 2529-2532 (2009).

Fan, S. et al. "A 5.2 μA Quiescent Current LDO Regulator With High Stability and Wide Load Range for CZT Detectors", IEEE Transactions on Nuclear Science, vol. 64, No. 4, pp. 1087-1094 (Apr. 2017).

Extended European Search Report for Patent Application No. 18305028.5 (dated Jun. 29, 2018).

Fernandez, Darwin, "Design considerations for a resistive feedback divider in a DC/DC converter," Texas Instruments Incorporated, Analog Applications Journal, www.ti.com/aaj, 2Q 2012, 7 pages.

Teel, John C., "Understanding noise in linear regulators," Texas Instruments Incorporated, Analog Applications Journal, www.ti.com/aaj, 2Q 2005, 4 pages.

* cited by examiner

LINEAR REGULATOR WITH A COMMON RESISTANCE

CROSS-REFERENCE TO RELATED APPLICATIONS

This application claims the priority under 35 U.S.C. § 119 of European patent application no. 18305028.5, filed on Jan. 15, 2018, the contents of which are incorporated by reference herein.

FIELD

This disclosure relates to linear regulators more specifically it relates to linear voltage regulators. It also relates to a semiconductor chip, and a near field communication device such as a battery assisted connected tag.

BACKGROUND

A typical linear voltage regulator comprises a transistor, the control terminal of which is connected to an error amplifier. A feedback loop is typically provided between an output from and one input to the error amplifier—the other input to the error amplifier being connected to a reference signal. Parameters which may be important from a design perspective of such voltage regulators include the stability against a variation of supply voltage, and losses in the system. For some applications, the on-chip area required by the voltage regulator can also be an important parameter.

FIG. 1 show a schematic of a typical linear regulator 100. This LDO (low drop out) linear regulator comprises a transistor 10 having a control terminal. A first main terminal, being a supply terminal of the transistor, is connected to a supply input, typically a voltage at a supply voltage Vss. The transistor has a second main terminal being an output terminal configured to provide a regulated output at an output connection, via an output circuit. The output circuit typically comprises a series load resistor Rs. In use a load is connected between the output connection and a ground, which may be a local or global ground. A load capacitance, show as Cload, is also typically connected between the output connection and ground.

The LDO includes an error amplifier 20 having a reference input, a feedback input and an output connected to the control terminal. A reference current source is connected to the reference input for providing a reference voltage at the reference input. The reference voltage typically is set by passing the current Iref from the reference current source through a reference resistance Rref to the local or global ground.

Feedback from the output terminal of the transistor is provided to the feedback input of the error amplifier through a feedback path (which may include a feedback resistance, not shown), for providing a feedback voltage to the feedback input.

In some applications, particularly those for which the LDO is not always operational, it may be advantageous to limit the current to relatively low values. To provide relatively low values of currents, relatively high values of the resistances are required. In the case of LDOs in which the components are all "on-chip", relatively high values of resistances in turn necessitates relatively large areas of silicon, or high so-called "real-estate".

SUMMARY

According to the present disclosure, there is provided a linear regulator comprising: a transistor having a control terminal, a first main terminal being a supply terminal connected to a supply input, and a second main terminal being an output terminal configured to provide a regulated output at an output connection; an error amplifier having a reference input, a feedback input and an output connected to the control terminal; a reference current source; a reference circuit configured to provide a reference voltage to the reference input from the reference current source; and a feedback circuit from the second main terminal and comprising a feedback resistance (Rfb) and configured to provide a feedback voltage to the feedback input of the error amplifier; wherein the feedback circuit and the reference circuit include a common resistance (Rtail, Rd3), and at least one of the reference circuit and the feedback circuit comprises a capacitive path (Cref) to a ground. A common resistance, resulting in at least partial sharing of one or more resistors between the reference and feedback branches, may allow for reduced resistance values, and thus a reduced area of silicon required for the regulator. Smaller regulators may lead to smaller devices or dies, with an associated reduction in the cost-per-die.

In one or more embodiments, the common resistance is connected to the ground. In one or more embodiments, the feedback circuit comprises a further resistance (Rpar) between the feedback input and the common resistance (Rtail), and a current path, comprising the further resistance and common resistance, from the feedback input to the ground. In other embodiments, more complex resistance networks may be provided, (such as replacing a single resistor by two or more resistors in series) having equivalent networks.

In one or more embodiments, the reference circuit comprises a reference resistor (Rref) in series with the common resistance (Rtail), and a reference current path, comprising the reference resistance and the common resistance, from the reference input to the ground.

In one or more embodiments, the output terminal is coupled to the output connection through an output resistance (Rs), and an output capacitance (Cload) is connected between the output connection and the ground. However, the output circuit may depend on the specific use or implementation of the LDO, for instance the output resistance Rs may be replaced by a part of the load itself.

In one or more embodiments, the capacitive path to the ground comprises a capacitance connecting a node which is in a path between the reference resistance and the common resistance, and the ground. In one or more other embodiments, the capacitive path comprises a capacitance connected between the reference input and the ground.

In one or more other embodiments, the reference circuit comprises a first current path between the reference input and the ground through a first delta resistance (Rd1), and a second current path to the ground through a second delta resistance (Rd2) and a third delta resistance (Rd3), wherein the second delta resistance connects the reference input and the feedback input, and wherein the third delta resistance comprises the common resistance.

In one or more embodiments, the reference current source comprises a current path from a voltage source and through a fixed resistance. However, it will be appreciated that, in the event that the fixed resistance is on-chip, additional silicon area will be required for the fixed resistance. Hence, in other embodiments, the reference current source comprises a current source such as a current mirror of a fixed current. Furthermore, avoiding such a fixed resistance may be preferred in some embodiments: since this resistance is typically arranged in parallel with the reference circuit's capacitive path (Cref) to ground, it reduces the influence of Cref and hence reduces the available phase lead compensation.

In one or more embodiments, the common resistance has a value between 0.05 and 5 MΩ, the reference resistance has a value between 0.05 and 5 MΩ, and the further resistance has a value between 0.05 and 2.5 MΩ; in one or more other embodiments the common resistance has a value between 0.5 and 5 MΩ, the reference resistance has a value between 0.5 and 5 MΩ, and the further resistance has a value between 0.05 and 2.5 MΩ; in one or more further embodiments, the first, second and third delta resistances each have a value between 0.5 and 5 MΩ; in one or more yet further embodiments, the first, second and third delta resistances each have a value between 0.5 and 5 MΩ. The reference capacitance may have a value between 100 fF and 50 pF.

According to another aspect of the present disclosure, there is provided a semiconductor chip comprising a linear regulator as described above, being a low drop out linear regulator, wherein the reference resistance, the further resistance and the common resistance are all provided on-chip According to yet another aspect of the present disclosure, there is provided a near field communication device comprising such a semiconductor chip and an antenna.

According to a further aspect of the present disclosure, there is provided a battery assisted connected tag, comprising a linear regulator as described above, a memory module, and an RF communication interface configured to, in use, control transmission of a signal by at least one of generating an electromagnetic field and modifying an electromagnetic field.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
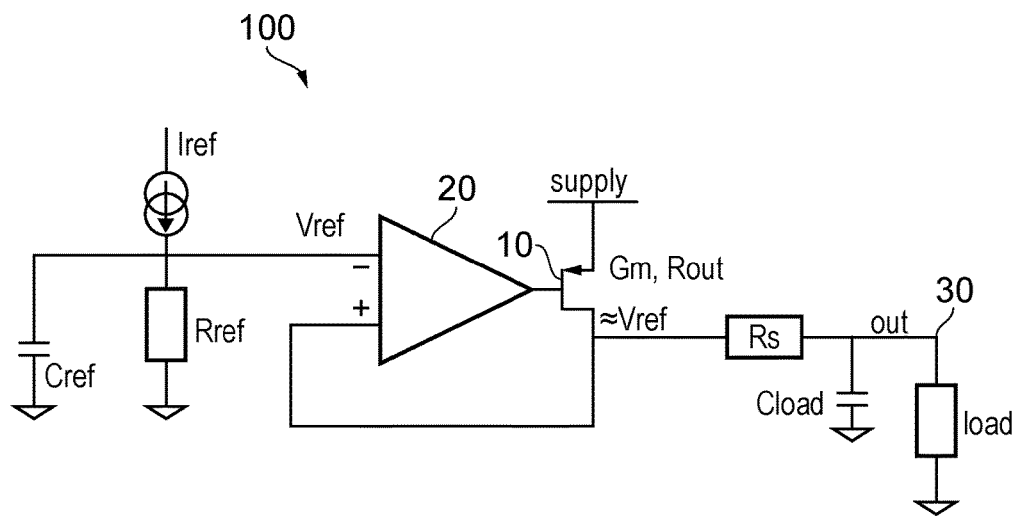
FIG. 1 shows a schematic of a typical LDO.

It should be noted that the figures are diagrammatic and not drawn to scale. Relative dimensions and proportions of parts of these figures may be shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 2:
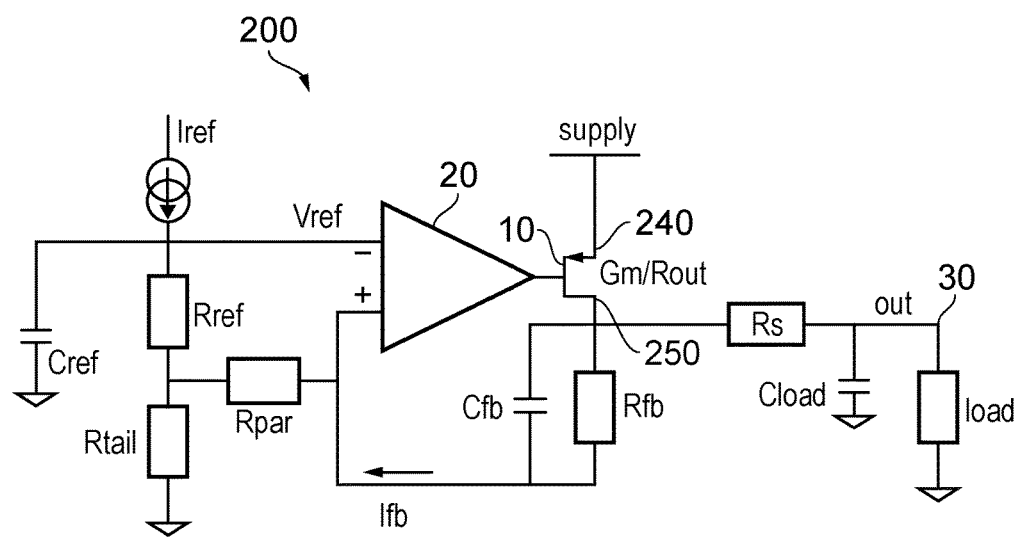
FIG. 2 shows a schematic of a linear regulator according to one or more embodiments.

FIG. 2 shows a schematic of a linear regulator 200 according to one or more embodiments. Similar to known LDO's, the linear regulator comprises a transistor having a control terminal, and a first main terminal 240 being a supply terminal connected to a supply input, for connection typically to a supply voltage Vss. The transistor may be implemented as a MOSFET. The transistor also has a second main terminal 250 being an output terminal configured to provide a regulated output at an output connection 30 via a resistance Rs. The linear regulator also comprises an error amplifier 20, with a certain gain and bandwidth (i.e. the frequency at which the gain has reduced by 3 dB), and having a reference input, a feedback input, and an output connected to the control terminal.

A reference circuit is configured to provide a reference voltage Vref to the reference input from a reference current source as shown in FIG. 2. The reference circuit includes two resistances, being a reference resistance Rref and a tail resistance Rtail, connected in series between the reference input of the error amplifier and ground. A feedback circuit from the second main terminal through a feedback resistance Rfb is configured to provide a feedback voltage to the feedback input of the error amplifier. The feedback circuit further includes two resistances being a link, or "parallel", resistance Rpar and the tail resistance Rtail, connected in series between the feedback input of the error amplifier and ground.

Thus the feedback circuit and the reference circuit include a common resistance being the tail resistance Rtail. By partially merging the reference and feedback branches, it may be possible to reduce the total resistance, and thus the total area used by resistors that provide the resistances. In a typical implementation, the input voltage for the error amplifier is chosen to be approximately 0.6V. Furthermore, the tail voltage—that is to say the voltage at the node between the reference resistance Rref and tail resistance Rtail in the reference path, and between Rpar and tail resistance Rtail in the feedback path, is typically chosen to ensure a relatively low total resistance, whilst being low enough to reduce or minimize influence of the amplifier's offset. A suitable range for this tail voltage is typically between approximately 0.3 and 0.44 V. Moreover, the ratio (Ifb/Iref) between the feedback current (Iref) and the reference current (Ifb) may be chosen to minimise the product of the sum (Ifb +Iref) of these currents, and the total resistance: typically, the reference current maybe half the feedback current: Ifb/Iref=~2.

Furthermore, partially merging the reference and feedback branches results in increased design flexibility for transient response: as shown in FIG. 2 the feedback loop may include a feedback capacitance Cfb in parallel with the feedback resistance Rfb. Alternatively, or in addition, the reference circuit may include a reference capacitance Cref connected between the reference input of the error amplifier and ground. The LDO loop may be stabilised by suitable choices of the values of these two capacitances, in connection with the value of the output resistance Rs.

By partially merging the reference and feedback branches through the common resistance Rtail, the resistance network (consisting of Rref, Rtail, Rpar and Rfb), combined with the capacitances Cref and Cfb, provides phase lead compensation. Phase lead compensation enables a reduction in the bandwidth required by the error amplifier, leading to a reduction in the current consumption in the operational amplifier (op amp) which implements the error amplifier. Overall, more current may be required in the resistor network, but since less current is required in the op amp, the total current consumption may be reduced. In typical embodiments, the quiescent current may be less than 1 µA, and the operational current may be less than 134 µA.

Figure 3:
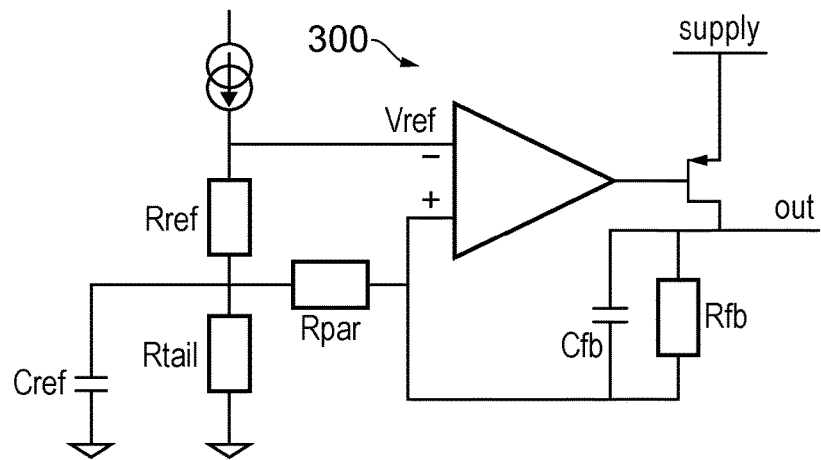
FIG. 3 shows a schematic of a linear regulator according to another embodiment, in which a reference capacitance is connected to a different part of the circuit.

Partially merging the feedback branches and reference branch enables increased layout design flexibility. An example of an alternative design is shown in FIG. 3. The LDO 300 shown in this figure is similar to that shown in FIG. 2—although for clarity the output circuit comprising Rs and Cload is not shown—however in this case, the reference capacitance Cref is connected to the node between the reference resistance and tail resistance rather than to the reference input of the error amplifier.

Figure 4:
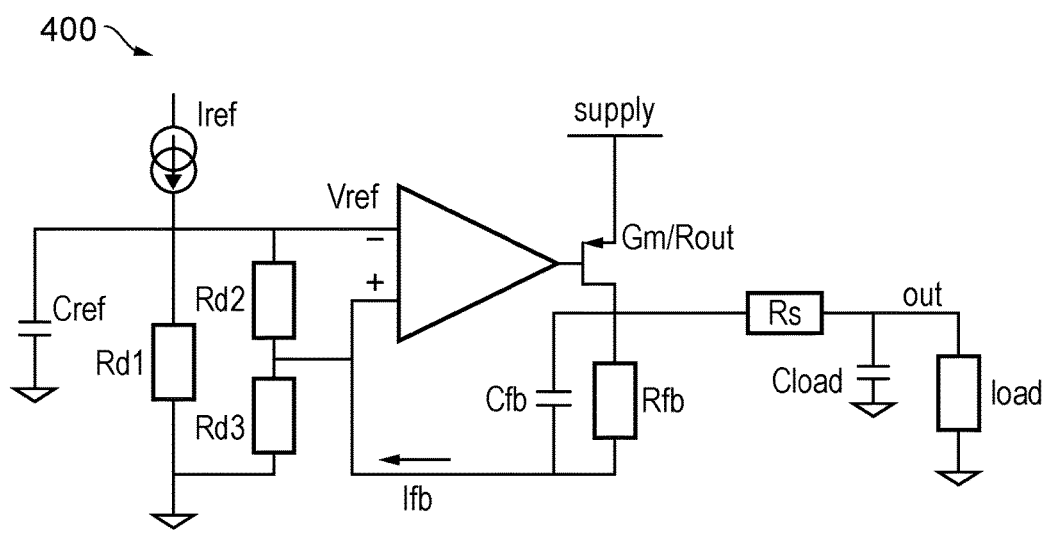
FIG. 4 shows a schematic of a linear regulator according to another embodiment, having an alternative resistance network.

The skilled person will appreciate that an equivalent circuit to the resistance network comprised of the reference (Rref) and tail (Rtail) resistances together with Rpar, may be formed by a so-called "Y-Delta" transform of the network. FIG. 4 shows a schematic of an LDO according to an embodiment having such an alternative resistance network. In this embodiment, the reference circuit comprises a first current path between the reference input and the ground through a first delta resistance (Rd1), and a second current path to the ground through a second delta resistance (Rd2) and a third delta resistance (Rd3), wherein the second delta resistance connects the reference input and the feedback input. The feedback circuit comprises the feedback resistance between the second terminal of the transistor and the feedback input to the error amplifier, together with the third delta resistance (Rd3) between the feedback input to the error amplifier and is the local or global ground. Thus in this embodiment, the third delta resistance comprises the common resistance.

However, it should be noted that, in experimental designs, the benefit of reduced silicon real estate required for the complete resistance network, is significantly lower, if present at all, in such a transformed resistance network, relative to the network shown in the embodiment of FIG. 2.

Figure 5:
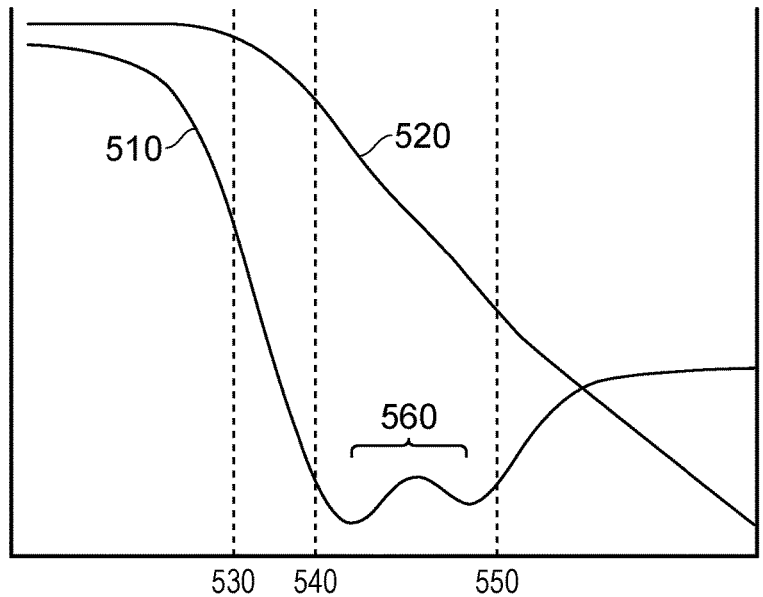
FIG. 5 shows the open-loop response of a linear regulator.

The open-loop response of an experimental LDO according to an embodiment such as that shown in FIG. 2 is depicted in FIG. 5. The values of the resistances for this specific embodiment were chosen to be Rref=1.3M MΩ, Rtail=1.2 MΩ, Rpar=0.65 MΩ, and Rfb=1.85 MΩ; similarly, the capacitances chosen were Cref=400 fF and Cfb=600 fF (along with a load capacitance C load of 300 pF). The transistor was chosen to have a trans-impedance of Gm=0.2 mS and an Rout of 270 KΩ, and the op amp to have a gain of 48 dB and 3 dB bandwidth of 14 kHz. A reference current source of 122 nA results in a feedback current of 244 nA; the op amp operates at around 600 mV, with a tail voltage at 440 mV, and an output terminal voltage of 1050 mV. (For completeness it is mentioned that the output resistance used was 325Ω).

The open-loop phase response of this configuration is shown at 510 and the open loop gain is shown at 520, plotted against frequency, on a log-scale on the x-axis. The system shows a dominant pole 530 at 2 kHz, together with an op-amp pole 540 at approximately 14 kHz. Also shown is the zero 550 of Rs to Cload, at approximately 14 MHz. The peak 560 between 40 and 800 kHz is the phase lead compensation.

Figure 6:
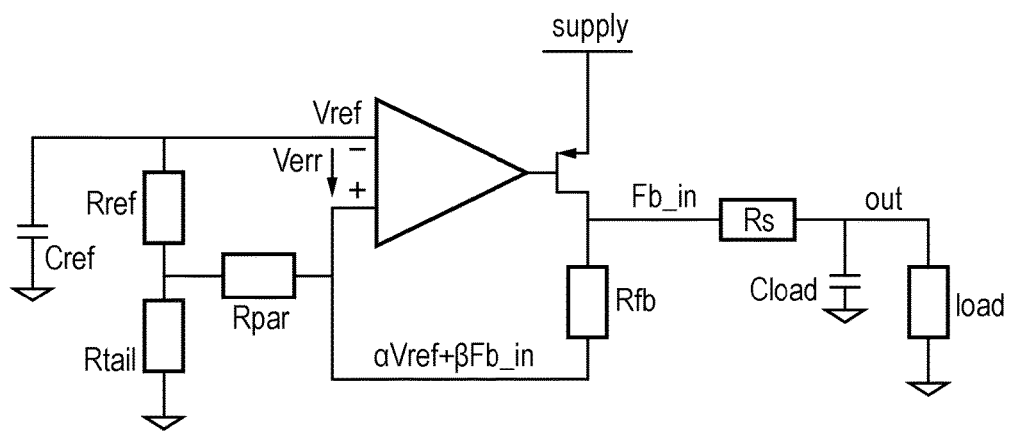
FIG. 6 shows a schematic of a linear regulator such as that shown in FIG. 2, for AC circuit analysis.

As already mentioned, including a common resistance in the feedback circuit and the reference circuit to partially merge these branches results in the greater design freedom, for example in how to connect to the reference capacitance Cref. An analysis of the feedback loop follows with reference to FIG. 6, to demonstrate the role of the reference capacitance. The analysis will be focus on AC behaviour, so the DC reference current source is not shown. Further, in order to facilitate an analytic solution, the feedback capacitance Cfb is not considered in the analysis (i.e. Cfb=0). The voltage at the output terminal is given by Fb_in, and the error voltage between the two inputs to the error amplifier is Verr.

Defining intermediate variables $\alpha, \beta, \gamma, \tau$:

$$\alpha = \frac{Rfb}{Rfb + Rpar + (Rref \ // \ Rtail)} \times \frac{Rtail}{Rtail + Rref}, \quad (eq\ 1)$$

$$\beta = \frac{Rpar + (Rref \ // \ Rtail)}{Rpar + (Rref \ // \ Rtail) + Rfb}, \quad (eq\ 2)$$

$$\gamma = \frac{Rtail}{Rtail + Rpar + Rfb}, \text{ and} \quad (eq\ 3)$$

$$\tau = Cref \times [Rref + (Rtail \ // \ (Rpar + Rfb))], \quad (eq\ 4)$$

the feedback transfer function can be expressed using $\alpha, \beta, \gamma$, and $\tau$ as follows $$Vref = \gamma \frac{Fb\_in}{1 + \tau p}, \quad (eq\ 5)$$

$$\frac{Verr}{Fb\_in} = \frac{(\alpha - 1)Vref + \beta Fb\_in}{Fb\_in} = \gamma \frac{(\alpha - 1)}{1 + \tau p} + \beta, \quad (eq\ 6)$$

$$\frac{Verr}{Fb\_in} = \gamma \frac{(\alpha - 1)}{1 + \tau p} + \beta \frac{1 + \tau p}{1 + \tau p} = \frac{\gamma(\alpha - 1) + \beta + \beta \tau p}{1 + \tau p}, \text{ and} \quad (eq\ 7)$$

$$\frac{Verr}{Fb\_in} = (\gamma(\alpha - 1) + \beta) \times \frac{1 + \frac{\beta}{\gamma(\alpha - 1) + \beta} \tau p}{1 + \tau p}. \quad (eq\ 8)$$

Equation 8 exhibits one pole and one zero. It is typical of an equation for a phase compensator, and demonstrates that the feedback loop behaves as a phase lead compensator because of the inclusion of capacitance Cref.

Using the same values for the resistor network as in the example above (Rfb=1.85 MΩ, Rpar=0.65 MΩ, Rtail=1.2 MΩ, Rref=1.3 MΩ) leads to the following values for intermediate variables: α=0.284, β=0.407, γ=0.324. This results in a pole-to-zero ratio of 2.3, which in turn corresponds to a maximum phase shift of 24°.

By adjusting the tail voltage, it is possible to adjust the maximum value of the phase compensation. Once the tail voltage is chosen, the required values for the resistances can be calculated. For example, with the following parameter choices: Vref=0.6V, Vout=1.05V, Iref=120 n, Ifb=240 n, applying the following relationships results in the feedback phase response shown in FIG. 7.

$$Rtail = \frac{Tail\_voltage}{iref + ifeedback}, \quad (eq\ 9)$$

$$Rref = \frac{Vref - Tail\_voltage}{iref}, \quad (eq\ 10)$$

$$Rpar = \frac{Vref - \text{Tail\_voltage}}{ifeedback}, \text{ and} \quad \text{(eq 11)}$$

$$Rfb = \frac{Vout - Vref}{ifeedback} \quad \text{(eq 12)}$$

Figure 7:
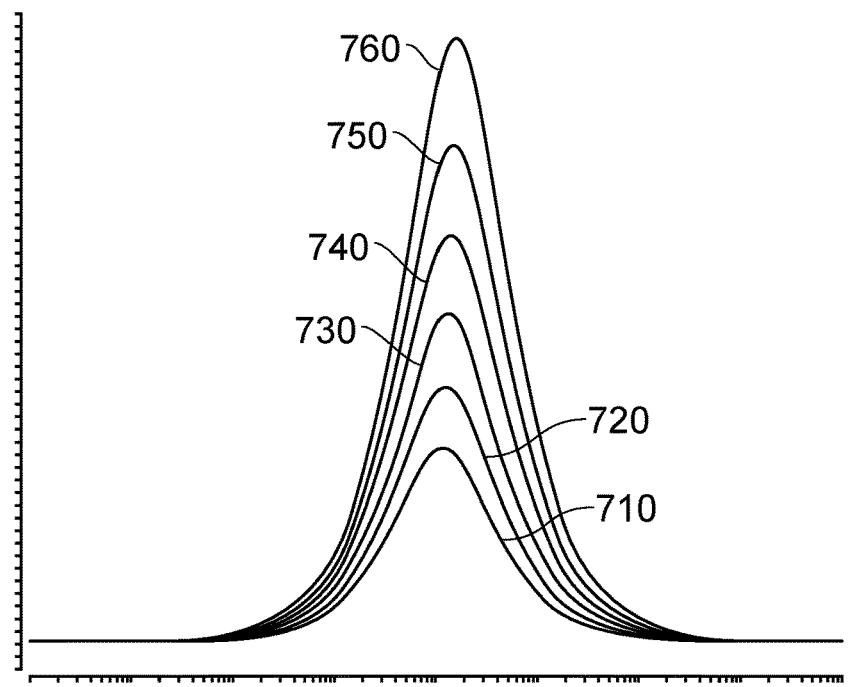
FIG. 7 shows an example of the feedback phase response of a linear regulator according to embodiments.

FIG. 7 show the feedback phase response, at 710, 720 . . . 760, for tail voltages at 0.2 V, 0.25 V . . . 0.45 V respectively. The peak of the phase compensation ranges from about 7° (at Vtail=0.2 V) to 24° (at Vtail=0.45 V).

Further, by adjusting the value of the reference capacitance, the frequency of the peak in phase compensation may be changed. For example, in the example above, modifying the reference capacitance from 250 fF to 550 fF results in the peak shifting from a frequency of 200 kHz down to about 80 kHz.

Figure 8:
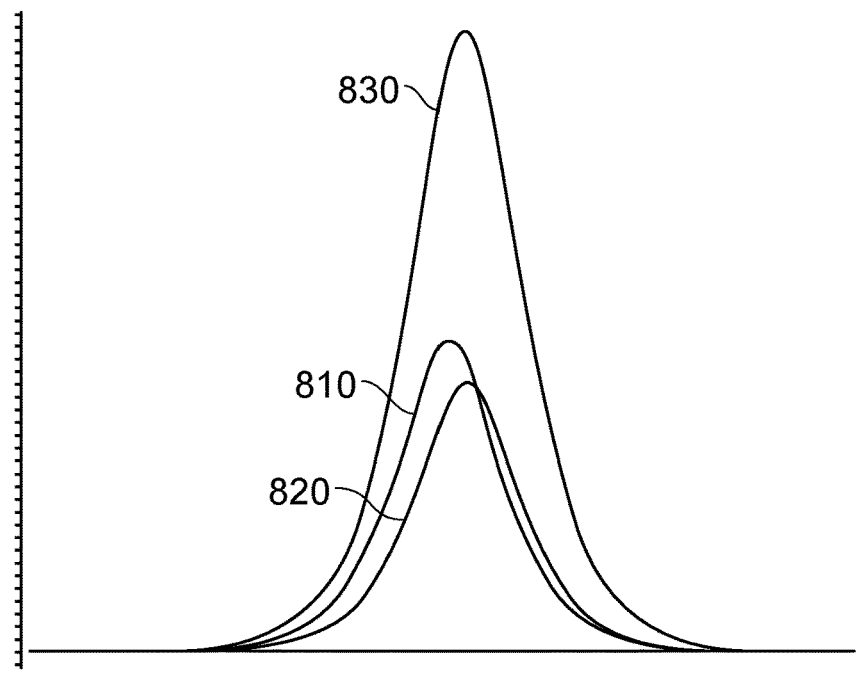
FIG. 8 shows an example of the feedback phase response of a linear regulator according to embodiments.

Including the effect from the feedback capacitance, enhances the phase shift; this is illustrated in FIG. 8. This figure shows an example of a feedback frequency response for a stand-alone reference capacitance Cref (that is to say Cfb=0) at 810, a stand-alone feedback capacitance (that is to say, Cref=0) at 820, and a combination of feedback and reference capacitances at 830. The combined operation reaches a peak phase shift of 48°, which exceeds the sum of the separate phase shifts (21° and 24° respectively) from the reference and feedback capacitances separately. Thus, by providing an AC short to the feedback resistance, the feedback capacitance reinforces the action of the reference capacitance, and conversely by providing an AC short to ground for the reference resistance, the reference capacitance reinforces the action of the feedback capacitance.

Figure 9:
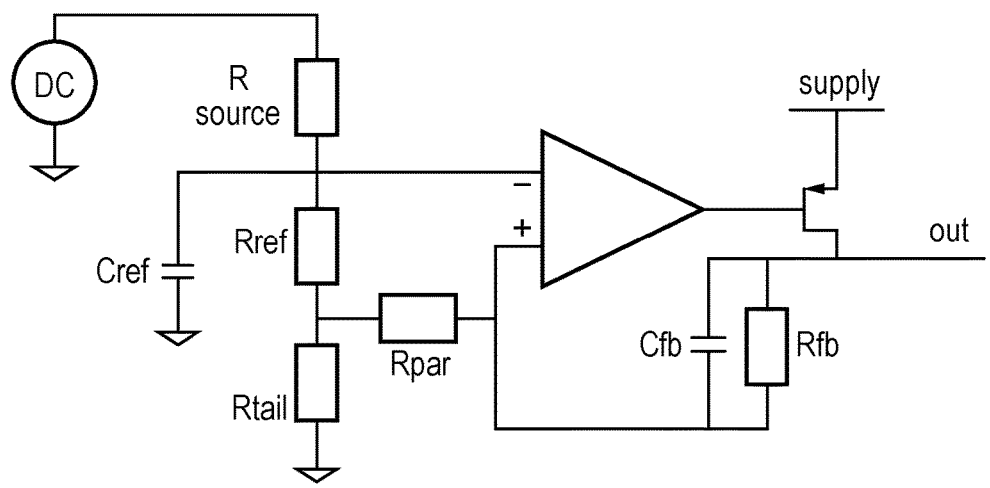
FIG. 9 shows a schematic of a linear regulator according to a further embodiment, wherein the reference is provided from a voltage reference source.

FIG. 9 shows a schematic of an LDO according to a further embodiment, wherein the reference is provided from a voltage reference source. This embodiment is similar to those described above; however, the reference current source Iref is replaced by a voltage source (labelled DC in FIG. 9), the current from which is routed to the reference input of the error amplifier through a source resistance Rsource. As discussed above, using a true current source, is generally preferred over using a voltage source and converting that into a current source by a fixed resistance R source: the fixed resistance would generally be implemented as a further on-chip resistor, using up real estate.

Figure 10:
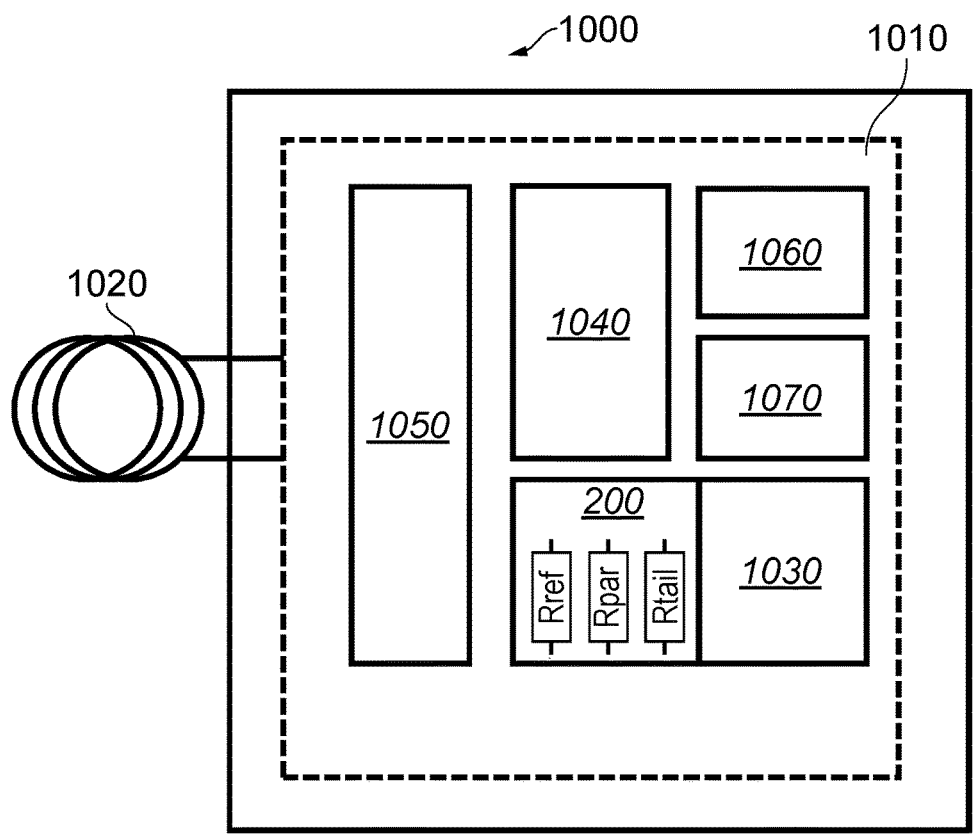
FIG. 10 shows in block diagram form a semiconductor chip, a near field communication device, and a battery assisted connected tag according to embodiments of the present disclosure.

FIG. 10 shows, in block diagram form, an example device comprising a linear regulator as described above. The figure shows a semiconductor chip 1010 comprising a linear regulator 200 as described above, being a low drop out linear regulator wherein the reference resistance Rref, the further resistance Rpar and the common resistance Rtail are all provided on-chip The semiconductor chip, along with antenna 1020 forms a near field communication device 1000.

An example of such a semiconductor chip 1060 is a connected tag, such as those supplied by NXP Semiconductors as "NTAG" devices for use with external antennas. The chip includes a power management unit 1030, comprising a low drop out linear regulator 200 as described above, a memory module 1040, and an RF communication interface 1050 configured to, in use, control transmission of a signal by at least one of generating an electromagnetic field and modifying an electromagnetic field. The communication unit is commonly referred to as the RF interface. The chip may include other functions, such as a digital control unit 1060, or, in the cases of an I2C NTAG connected device, an I2C interface 1070 as shown.

Including an interface for an external power supply—in particular a battery—provides the device with the flexibility to operate in passive mode or active mode. Such a battery assisted connected tag benefits from the small area of silicon required for the LDO, and/or relatively high operating efficiencies, which may be achieved according to embodiments of the present disclosure. By making the LDO smaller, it may be possible to shrink the overall semiconductor chip; high operating efficiencies may prolong battery-operated stand-by phases.

From reading the present disclosure, other variations and modifications will be apparent to the skilled person. Such variations and modifications may involve equivalent and other features which are already known in the art of low dropout linear regulators and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

From one perspective, there is provided a linear regulator comprising: a MOSFET having a gate, a source connectable to a supply voltage, and a drain configured to provide a regulated voltage through an output circuit; an operational amplifier configured as an error amplifier; the output of the error amplifier being connected to the gate of the MOSFET; the error amplifier being for amplifying an error between a reference voltage input and a feedback voltage input; the reference voltage input being provided by a reference circuit, the reference circuit including a current path to ground; the feedback voltage input being provided by a feedback circuit from the drain of the MOSFET, the feedback circuit including a current path to ground; wherein the reference circuit and the feedback circuit include a common resistance, and where in the reference circuit further comprises a reference capacitance forming a capacitive path to ground from the reference voltage input.

In one of more embodiments, the common resistance is in the current path to ground of the feedback circuit and in the current path to ground of the reference circuit.

In one or more embodiments, the linear regulator further comprises a feedback capacitance connected between the drain of the MOSFET and the feedback voltage input.

The invention claimed is:
1. A linear regulator comprising:
a transistor having a control terminal, a first main terminal being a supply terminal connected to a supply input, and a second main terminal being an output terminal configured to provide a regulated output at an output connection;

an error amplifier having a reference input, a feedback input and an output connected to the control terminal;

a reference current source;

a reference circuit configured to provide a reference voltage to the reference input from the reference current source; and a feedback circuit from the second main terminal and comprising a feedback resistance and configured to provide a feedback voltage to the feedback input of the error amplifier;

wherein the feedback circuit and the reference circuit include a common resistance, and at least one of the reference circuit and the feedback circuit comprises a capacitive path to a ground.

2. A linear regulator as claimed in claim 1, wherein the common resistance is connected to the ground.

3. A linear regulator according to claim 2 wherein the feedback circuit comprises a further resistance between the feedback input and the common resistance, and a current path, comprising the further resistance and common resistance, from the feedback input to the ground.

4. A linear regulator according to claim 2 wherein the reference circuit comprises a reference resistor in series with the common resistance, and a reference current path, comprising the reference resistance and the common resistance, from the reference input to the ground.

5. A linear regulator according to claim 1, wherein the output terminal is coupled to the output connection through an output resistance, and further comprising an output capacitance connected between the output connection and the ground.

6. A linear regulator according to claim 1, wherein the capacitive path to the ground comprises a capacitance connecting a node which is in a path between the reference resistance and the common resistance, and the ground.

7. A linear regulator according to claim 2 wherein the reference circuit comprises a first current path between the reference input and the ground through a first delta resistance, and a second current path to the ground through a second delta resistance and a third delta resistance, wherein the second delta resistance connects the reference input and the feedback input, and wherein the third delta resistance comprises the common resistance.

8. A linear regulator according to claim 2, wherein the capacitive path comprises a capacitance connected between the reference input and the ground.

9. A linear regulator according to claim 2, wherein the reference current source comprises a current path from a voltage source and through a source resistance.

10. A linear regulator according to claim 2, wherein the reference current source comprises a current mirror of a fixed current.

11. A linear regulator either: according to claim 3, wherein the common resistance has a value between 0.05 and 5 MΩ, the reference resistance has a value between 0.05 and 5 MΩ, and the further resistance has a value between 0.05 and 2.5 MΩ;

or according to claim 7, where the first, second and third delta resistances each have a value between 0.05 and 5 MΩ.

12. A linear regulator according to claim 1, wherein the reference capacitance has a value between 100 fF and 50 pF.

13. A semiconductor chip comprising a linear regulator as claimed in claim 1, being a low drop out linear regulator, wherein the reference resistance, the further resistance and the common resistance are all provided on-chip.

14. A near field communication device comprising a semiconductor chip as claimed in claim 13 and an antenna.

15. A battery assisted connected tag, comprising a linear regulator as claimed in claim 1, a memory module, and an RF communication interface configured to, in use, control transmission of a signal by at least one of generating an electromagnetic field and modifying an electromagnetic field.

* * * * *